(12) United States Patent
Frankenberger et al.

(10) Patent No.: US 8,662,278 B2
(45) Date of Patent: Mar. 4, 2014

(54) SENSOR FOR CHECKING VALUE DOCUMENTS

(75) Inventors: Jorg Frankenberger, Markt Schwaben (DE); Wolfgang Deckenbach, Schechen (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 13/516,432

(22) PCT Filed: Dec. 16, 2010

(86) PCT No.: PCT/EP2010/007705
§ 371 (c)(1),
(2), (4) Date: Jun. 15, 2012

(87) PCT Pub. No.: WO2011/072864
PCT Pub. Date: Jun. 23, 2011

(65) Prior Publication Data
US 2012/0247917 A1  Oct. 4, 2012

(30) Foreign Application Priority Data
Dec. 18, 2009  (DE) .......................... 10 2009 058 807

(51) Int. Cl.
*G06K 7/01* (2006.01)
*G07D 7/12* (2006.01)

(52) U.S. Cl.
USPC ........................................................ 194/207

(58) Field of Classification Search
USPC ........... 194/207; 250/559.01, 559.05, 559.07; 382/135, 140; 356/51, 71; 359/362; 257/82, 88, 89
See application file for complete search history.

(56) References Cited

U.S. PATENT DOCUMENTS

| 2004/0021064 A1 | 2/2004 | Baudat |
| 2009/0224694 A1 | 9/2009 | Höring et al. |

FOREIGN PATENT DOCUMENTS

| DE | 102 39 225 A1 | 3/2004 | |
| DE | 10 2005 029 119 A1 | 12/2006 | |
| DE | 20 2007 013 090 U1 | 1/2008 | |
| DE | 102007031230 B3 | 10/2008 | |
| JP | 2005276849 A | 10/2005 | |
| JP | 200658488 A | 3/2006 | |
| WO | 9731340 A1 | 8/1997 | |
| WO | WO 97/31340 * | 8/1997 | .............. G07D 7/00 |
| WO | 2005109352 A1 | 11/2005 | |

OTHER PUBLICATIONS

International Search Report for PCT/EP2010/007705, Apr. 4, 2011.
International Preliminary Report on Patentability for PCT/EP2010/007705, Jun. 26, 2012.
German Search Report issued in DE 10 2009 058 807.8, dated Dec. 18, 2009.

* cited by examiner

*Primary Examiner* — Mark Beauchaine
(74) *Attorney, Agent, or Firm* — Workman Nydegger

(57) ABSTRACT

A sensor for checking value documents, which has an illumination device for illuminating a value document, an imaging optic and a detection device. The illumination device of the sensor contains a multiplicity of light sources arranged side by side, which have emission spectra that differ from each other, and a microlens array with a multiplicity of microlenses. The microlens array and the light-source receiver are arranged so that when each of the light sources is arranged on the light-source receiver there is associated therewith exactly one of the microlenses. The measuring plane of the sensor is so close to a focal point of the imaging optic that the light of the different light sources emitted by the illumination device is largely imaged onto the same illuminated region of the measuring plane.

19 Claims, 3 Drawing Sheets

SENSOR FOR CHECKING VALUE DOCUMENTS

BACKGROUND OF THE INVENTION

A. Field of the Invention

The invention relates to a sensor for checking value documents and an apparatus for checking value documents, said apparatus containing the sensor.

B. Related Art

For checking value documents usually sensors are used, with which the type of the value documents is determined and/or with which the value documents are checked for authenticity and/or their state. Such sensors are used for checking value documents such as e.g. bank notes, checks, identity cards, credit cards, check cards, tickets, vouchers and the like. The check of the value documents takes place in an apparatus for value document processing which, depending on the value document properties to be checked, contains one or several different sensors. Usually the value documents upon checking are scanned in one or several tracks, whereby the sensor and the value document are moved relative to each other.

The value documents are frequently checked with the aid of optical sensors, which capture the light emanating from the value documents. To illuminate a value document light sources of different colors are used. Usually the light emitted by the light sources is directed onto the value document to be checked directly or with the aid of lenses. However, there is the problem that several different light sources which are disposed in different locations are to illuminate the same region on the value document. With the aid of beam splitters a common beam path for the emission light of the light sources could be achieved; due to the partial transmissivity of the beam splitters, however, a large proportion of the emission light remains unused.

It is also known to use, for illuminating the value document, several light sources of different colors, whose light is directed onto the value document via a common light guide. Due to the relative movement between the sensor and the value document transported past it, however, a minimum distance between the light guide and the sensor is required. Since the light diverges upon exiting from the light guide, this minimum distance results in the illuminated area on the value document being relatively large and the illumination intensity being correspondingly low. Such an illumination is thus unfavorable when the optical properties of a value document are to be captured in a spatially limited region.

It is thus an object of the present invention to supply a sensor for checking value documents which can illuminate largely the same spatially limited region of the value document with the emission light of different light sources.

SUMMARY OF THE DISCLOSURE

The sensor has an illumination device for illuminating the value document to be checked by the sensor, an imaging optic and a detection device. For checking a value document the value document is brought into a measuring plane, in particular into a capture region of the sensor lying in the measuring plane. The illumination device of the sensor has a multiplicity of different light sources, which are arranged side by side and whose emission spectra are different from each other. By the imaging optic the light emitted by the illumination device is imaged onto a region of the measuring plane that is illuminated by the light of the illumination device. The detection device is configured to detect light which, upon operating the sensor, when the value document is illuminated by the illumination device, emanates from the illuminated region.

The light sources can e.g. be arranged in a one-dimensional or two-dimensional grid. The light emitted by the light sources is collected by a microlens array, which is a component of the illumination device and is arranged between the light sources and the imaging optic. The microlens array of the illumination device contains a multiplicity of microlenses which direct the collected light onto the imaging optic. The microlens array and the light sources are arranged relative to each other in such a fashion that with each of the light sources there is associated exactly one of the microlenses. Upon operating of the sensor thus the emission light of each of the light sources is collected by exactly one microlens of the microlens array. Each of these microlenses therein collects only the emission light of exactly one of the light sources. By the microlens associated with the respective light source the emission light of each of the light sources is collected with great efficiency.

The imaging optic is arranged on the side of the microlens array facing the value document. The imaging optic is configured to collect the emission light of each of the light sources, after passage through the respective microlens, and to image it onto a value document to be checked by the sensor. The light emitted by the illumination device is imaged by the imaging optic via a defined beam path onto the illuminated region of the measuring plane or of the value document. The imaging optic preferably has one or several refractive optical elements and/or diffractive and/or mirroring optical elements, which image the light emitted by the light sources onto the value document. Preferably the imaging optic is formed by one or several imaging lenses. Since an imaging of the illuminating light onto the value document takes place, the illuminated region of the value document is clearly defined and spatially limited. This represents an advantage in comparison to a direct illumination of the value document by the light sources (without interposed optic) and in comparison to a simple light-guide optic (without imaging optic) by which the light is not imaged, but brought onto the value document by the light guide without a defined beam path.

The light sources, the microlens array and the imaging optic are arranged relative to each other such that the emission light of each of the light sources can be imaged by the microlens array and the imaging optic onto the measuring plane or can be imaged onto a value document present in the measuring plane to be checked by the sensor. Each of the light sources is preferably imaged by the microlens associated therewith and the imaging optic such that the region of the measuring plane illuminated by the light source is enlarged in comparison to the light source. The microlenses of the microlens array and the imaging optic are preferably arranged and configured in such a fashion that the light sources are imaged in a blurred fashion onto the illuminated region of the measuring plane. It can thereby be achieved that also such light sources, via whose light exit area the light is emitted very inhomogeneously, illuminate at least a portion of the illuminated region homogeneously.

The measuring plane lies so close to the focal point of the imaging optic that the light of the different light sources emitted by the illumination device is imaged largely onto the same illuminated region of the measuring plane. It can thereby be achieved that, despite the illumination of the value document with different light sources arranged side by side, always essentially the same region of the value document to be checked can be illuminated and detected by the detection device. Preferably the imaging optic is arranged such that respectively the illuminated region of the measuring plane onto which the light of one of the different light sources of the illumination device is imaged by the imaging optic, overlaps by at least 50% with the region illuminated by the other light sources of the illumination device.

For example the different light sources of the illumination device are arranged side by side on a light-source receiving means that is common to the light sources. The light-source receiving means has e.g. a multiplicity of light source positions, which are respectively configured to receive a chip-shaped light source, in particular to receive a light emitting diode. The light sources are arranged on the light-source receiving means such that their arrangement corresponds to the arrangement of the microlenses within the microlens array. The microlens array preferably contains fastening means configured for fastening the microlens array to the light-source receiving means. The light-source receiving means has a counterpart matching the fastening means of the microlens array.

Preferably, the light sources and the microlens array are arranged relative to each other such that each light source of the illumination device is less remote from the microlens associated therewith than the focal length of this microlens. Since the distance of the light source from the microlens associated therewith is smaller than the focal length of the microlens, a particularly great proportion of the light emitted by the light source can be collected. Alternatively the distance between the light source and the microlens associated therewith can also amount to more than the single focal length, but then preferably less than the double focal length of the microlens.

In a preferred embodiment the microlenses of the microlens array are configured as aspherical microlenses and/or the imaging optic has at least an aspherical imaging lens. In particular the aspherical shape of the imaging lens is coordinated with the aspherical shape of the microlenses in such a fashion that a portion within the illuminated region of the measuring plane is homogeneously illuminated by the emission light of each of the different light sources. For this purpose it is preferred that the shape of the aspherical microlenses and the shape of the aspherical imaging lens deviate qualitatively in the same fashion from a spherical lens shape of the respective lens. This means that the shape of the aspherical microlenses and the shape of the aspherical imaging lens deviate in such a fashion from a spherical shape that all these aspherical lenses are either more strongly curved at the edge than in the middle of the respective aspherical lens or that all these aspherical lenses are less strongly curved at the edge than in the middle of the respective aspherical lens. With reference to a spherical shape of the respective lens, in which the lens has, from its middle to its edge, continuously the shape of a spherical shell (thus a constant curvature), thus the surfaces of the aspherical microlenses and the surfaces of the aspherical imaging lens are either both more strongly curved or both less strongly curved at the edge of the respective aspherical lens than in the middle of the respective aspherical lens. In a preferred variant the shape of the microlenses and/or the shape of the imaging lens deviate from a spherical lens shape such that the surface of the respective lens is less strongly curved at the edges than in the middle of the respective lens.

To homogenize the light emitted by the illumination device, a scatterer can be arranged between the microlens array and the imaging optic. Preferably the scatterer is configured as a scattering foil, in particular as a scattering foil having a defined, light-scattering structure so as to distribute the light emitted by the illumination device in a targeted manner over a certain angular range. The scatterer, in particular the scattering foil can be employed, in addition to the aspherical microlenses and/or the aspherical imaging lens, for homogenizing the light emitted by the illumination device. The scatterer, in particular the scattering foil, however, can also be employed instead of the aspherical microlenses and/or of the aspherical imaging lens for homogenization, i.e. in connection with spherical microlenses and/or with a spherical imaging lens.

The illumination device has a multiplicity of light sources with a multiplicity of different emission spectra. This means that the multiplicity of light sources supplies a multiplicity of different emission spectra, whose intensity maxima lie at different wavelengths. For example each of the light sources of the illumination device is configured to emit an emission line at a certain wavelength, whose spectral position differs from the emission lines of all other light sources of the illumination device. Alternatively, however, the illumination device can also have several identical light sources, for example to obtain sufficient intensity of illumination also in a spectral range with low-luminosity light sources. In particular the illumination device can have one or several light sources whose emission spectra lie in the visually visible spectral range and/or one or several light sources whose emission spectra lie in the infrared spectral range and/or one or several light sources whose emission spectra lie in the ultraviolet spectral range. As light sources preferably light emitting diodes are employed, for example light emitting diodes (LED), in particular semiconductor light emitting diodes or organic light emitting diodes (OLED), and/or laser diodes, in particular vertical-cavity surface emitting lasers (VCSEL).

For checking the value document the light sources are switched on and off successively, to illuminate a region of the value document with an illumination sequence of light pulses with different emission spectra. The detection device is configured to detect light which, upon checking the value document, emanates from the region of the value document illuminated by the illumination sequence. For each of the light pulses of the illumination sequence, in so doing, a measured value is detected, to record a spectral intensity distribution of the detected light. The detected measured values respectively correspond to the light intensity, which is detected upon illumination with one of the light pulses of the illumination sequence. The spectral intensity distribution of the detected light is derived from the detected measured values.

The invention moreover relates to an apparatus for checking value documents, containing one or several of the sensors according to the invention. The apparatus can have a transport system configured to transport value documents past the sensor, so that successively several regions of the value document can be detected by the sensor. In the variant in which, for the purpose of checking, the value document is transported past the sensor at a transport speed, the duration of the illumination sequence is preferably coordinated with the transport speed of the value document such that all light pulses which are emitted during the illumination sequence by the light sources illuminate almost the same region of the value document transported past despite the movement of the value document.

The sensor is not configured to check the full surface of the value document, but to check the value document in one or several tracks on the value document. In case of a check of several tracks, respective value document regions are arranged between the tracks, which are not checked by the sensor. The regions illuminated for checking the value document form tracks that extend parallel to each other and along the transport direction of the value document. The tracks are distributed discretely on the value document. For each of the tracks there is provided at least an illumination device, an imaging optic and a detection device according to the above description. The illumination sequences preferably succeed one another so fast that the value document is checked virtually continuously along each of the tracks. Alternatively, for checking the value document, said value document can also be positioned statically in the measuring plane of the sensor.

So as to obtain a one-to-one association between the microlenses and the light sources, the microlenses in the microlens array are preferably arranged in the same two-dimensional grid as the light source positions are arranged on the light-source receiving means. In particular the microlens array is configured as a one-pieced body. The microlens array preferably has fastening means which can be an integral component of the microlens array, in particular of the one-pieced body. The fastening means of the microlens array are e.g. configured as fastening pins or as holes for receiving fastening pins, which are provided on the light-source receiving means. The microlenses are configured e.g. as plano-convex microlenses, whereby the planar side of the microlenses faces the light source that is associated with the respective microlens. Preferably all microlenses of the microlens array are configured identically, so as to ensure a greatest possible variability in the arrangement of the light sources on the light-source receiving means. In particular for this purpose all microlenses have the same shape and/or the same focal length. In particular all microlenses of the microlens array are arranged so that they are coplanar in relation to each other. Alternatively also some microlenses of the microlens array can have a shape and/or focal length deviating from the other microlenses. Thereby e.g. an individual adaptation of the microlenses to the optical properties of the light sources could be achieved, with which they are associated and for whose light collection they are provided.

Using the microlens array results in great advantages in comparison to an illumination device in which an individual lens is used for each light source. For in this case an individual mount would have to be provided for each of the individual lenses, and upon fastening the individual lenses the exact positioning relative to the respective light source would have to be ensured. It can be required here that the exact position and/or orientation of the individual lenses has to be adjusted afterwards. In contrast, when a microlens array having exactly one microlens for each light source is used, a single exact positioning is sufficient. This positioning can take place by the fastening means of the microlens array, which are connected with the corresponding counterparts of the light-source receiving means. The production of the sensor can thus take place in a much simpler fashion and without adjustment. In contrast to the realization of a corresponding illumination with individual lenses, which have to be mounted individually and in whose arrangement there always remain gaps, in the microlens array there is moreover no or only a minimal gap between the individual lenses. Since the microlens array is configured as a one-pieced body the microlenses can run directly into each other. By the microlens array thus a virtually area-covering light collection can be achieved. By the microlens array thus an illumination device can be formed which has a high light collection efficiency and which is very compact.

The detection device of the sensor preferably has a spectral sensitivity which is so spectrally broad-band that the emission light of each of the light sources of the illumination device is detectable by the detection device. In particular the detection device is configured for detecting light of the visually visible spectral range and/or for detecting light of the near infrared spectral range adjacent thereto. The measured values recorded by the detection device are subsequently evaluated by an evaluation device, which can be a component of the sensor or is also formed by an external evaluation device. Preferably, by the sensor, in particular by an internal evaluation device of the sensor, at least a preprocessing of the measured values takes place. The further evaluation can also take place through the internal evaluation device or alternatively through a central evaluation device of the apparatus, in which the sensor is installed.

In front of the detection device there is preferably arranged a detection optic, by which light emanating from the value document is collected and directed onto a light-sensitive region of the detection device. The detection optic can be realized e.g. through refractive or diffractive optical elements or through mirrors. The detection optic and the detection device are configured and arranged such that, upon operating of the sensor, there is detected, of the light emanating from the illuminated region of the value document, only light from a detection region of the value document which detection region is arranged completely within the illuminated region. By arranging the detection region completely within the illuminated region it is achieved that the detected light intensity is insensitive to flutter motions of the value document which can occur upon transporting the document. The sensor is thus moreover also tolerant toward possible position variations of the illumination device, the imaging optic or the detection optic, which can occur during production or assembly of the sensor. Preferably the detection region is arranged completely within a homogeneously illuminated portion of the illuminated region. In the homogeneously illuminated portion the intensity of the illumination is preferably homogeneously distributed for all light pulses of the illumination sequence.

Preferably for the sensor a control device is provided which is adapted to successively switch on and off again the light sources of the illumination device, so as to illuminate the value document successively with different emission spectra. The value document can be illuminated successively with such different emission spectra of the light sources that a spectral intensity distribution of the light emanating from the value document can be captured. The control device can be configured as a component of the sensor, but it can also be configured as an external control device, e.g. as a component of an apparatus for processing value documents, in which the sensor is installed. The control device is adapted to drive the illumination device of the sensor, in particular the light sources, and the detection device of the sensor. Upon operating of the sensor the control device switches the light sources successively on and off again, for example so that at any point in time exactly one of the light sources is switched on. At one or several of the points in time, however, also several of the light sources can be switched on simultaneously, e.g. several light sources with the same emission spectrum. Moreover, the control device causes the detection device to capture during the switched-on phase of the light sources respectively one measured value that corresponds to the light intensity emanating from the value document. Since the detection device records respectively one measured value synchronously to the illumination by the light sources, thus for those wavelengths which are predetermined by the emission spectrum of the respective light source, the light intensity emanating from the value document is detected.

Upon configuring the sensor the illumination sequences are defined which are used for checking the document, in particular which light sources are switched on and off for illuminating the value document. In so doing, the control device is so configured that the light sources of the illumination device, upon operating of the sensor, are successively switched on and off, so that the value document can be illuminated successively with different emission spectra. The control device provided for the sensor can be configured already upon producing the sensor. However, it can be provided that the configuration of the control device is carried out only after the completion of the sensor. Further it can be provided that the configuration of the control device is changeable also after the initial operation of the sensor. Such a reconfiguration after the initial operation can e.g. be carried out by the producer of the sensor or by an operator of the apparatus in which the sensor is installed. Upon reconfiguring it can also be necessary to adapt the driving of the detection device to the driving of the illumination, e.g. when the number of light sources that are switched on and off for measuring is changed. Upon reconfiguring also the evaluation device used for evaluating the recorded measured values must be adapted to the changed configuration of the control device, e.g. when other light sources are used for measuring.

Preferably the sensor moreover has a housing in which the illumination device, the imaging optic and the detection device, optionally also the control device and detection optic, are arranged.

DESCRIPTION OF THE DRAWINGS

Hereinafter the invention will be explained by way of example with reference to the following figures. The figures are described as follows.

DETAILED DESCRIPTION OF PREFERRED EMBODIMENTS

Figure 1A:
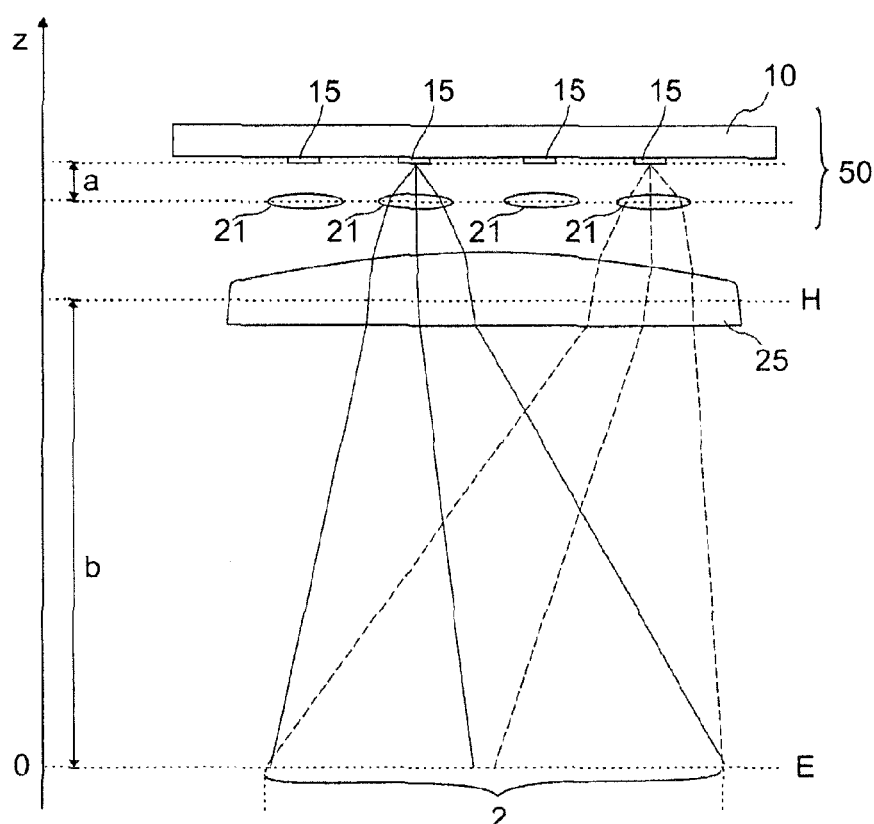
FIG. 1a An example of an illumination device and of an imaging optic of the sensor for illuminating a region of the measuring plane, FIG. 1b an intensity distribution of the light imaged onto the illuminated region of the measuring plane, FIG. 2a a light-source receiving means with a multiplicity of light sources and a microlens array appurtenant to the light-source receiving means, FIG. 2b the light-source receiving means of FIG. 2a with light sources arranged thereon and the appurtenant microlens array, FIG. 2c a section through an illumination device formed by the light-source receiving means, the light sources and the appurtenant microlens array of FIG. 2b, FIG. 3a a sensor checking a value document transported past the sensor, FIG. 3b a detail of a value document on which the illuminated region, the homogeneously illuminated region and the detection region are represented.

In FIG. 1a an example is represented for an illumination device 50 and an imaging lens 25 of a sensor according to the invention. To image into the measuring plane E the light emitted by the illumination device 50 there can, however, also be used as an imaging optic, alternatively to the imaging lens 25, other optical components, e.g. lens systems, diffractive optical components, e.g. a Fresnel lens, or imaging mirrors. The illumination device 50 comprises a multiplicity of light sources 15 which are arranged on a common light-source receiving means 10 in this example, as well as a microlens array with a multiplicity of microlenses 21. The distance a between the microlenses 21 and the light sources 15 is chosen smaller than the focal length of the microlenses 21, so that the microlenses 21 collect an as large as possible proportion of the emission light emanating from the light sources 15. The light collected by the microlenses 21 is so imaged by an imaging lens 25 onto the measuring plane E, that in the measuring plane E a region 2 is illuminated. For reasons of clarity in FIG. 1a only the path of some light beams for two of the light sources 15 is drawn in. For checking a value document, a value document is brought into the measuring plane E of the sensor. So as to capture successively several regions of the value document with the sensor, the value document can be transported past the sensor. However, the value document can also be statically positioned in the measuring plane E for checking.

The imaging lens 25 is arranged and configured such that the emission light of the different light sources 15 is largely imaged onto the same region 2 of the measuring plane E. The distance b between the optical main plane H of the imaging lens 25 and the measuring plane E is preferably chosen such that the focal point of the imaging lens 25 lies exactly or at least approximately in the measuring plane E. It is thus achieved that the emission light of all light sources 15 is largely imaged onto the same illuminated region 2 of the measuring plane E. The microlens array 20 and the imaging lens 25 are preferably arranged and configured in such a fashion that the light sources 15 are imaged indistinctly onto the illuminated region 2 of the measuring plane E. Thereby also such light sources whose surface radiates very inhomogeneously can illuminate the region 4 homogeneously.

Figure 1B:
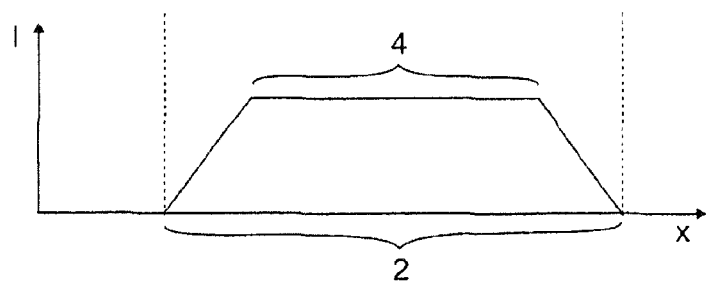

The imaging lens 25 and the microlenses 21 are configured as aspherical lenses and, in so doing, are preferably coordinated with each other such that by each of the light sources 15 largely the same portion 4 in the measuring plane E can be illuminated homogeneously. Thereby in the measuring plane E an illumination can be achieved, whose illumination intensity I as a function of the location x in the measuring plane E is sketched in FIG. 1b. From the edge of the illuminated region 2 to the middle the illumination intensity I increases and the middle portion 4 of the illuminated region 2 is illuminated homogeneously. The illumination intensity I is approximately constant in this homogeneously illuminated portion 4.

Figure 2A:
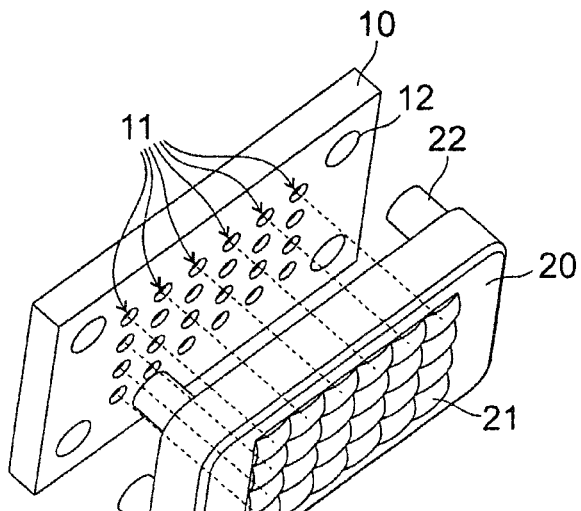
Figure 2B:
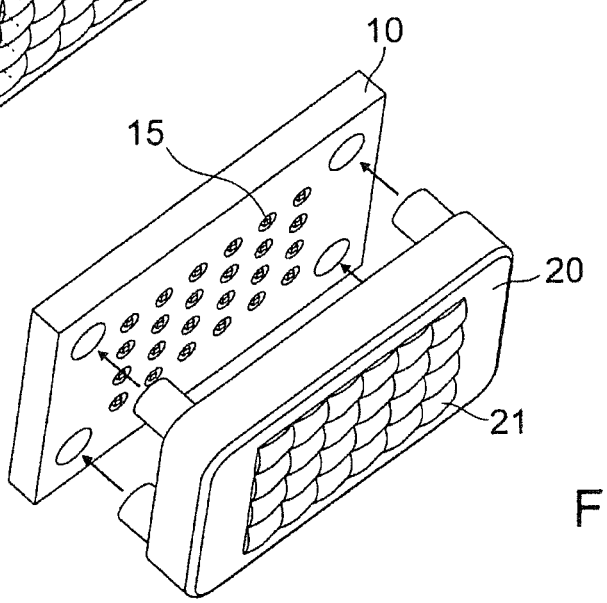
Figure 2C:
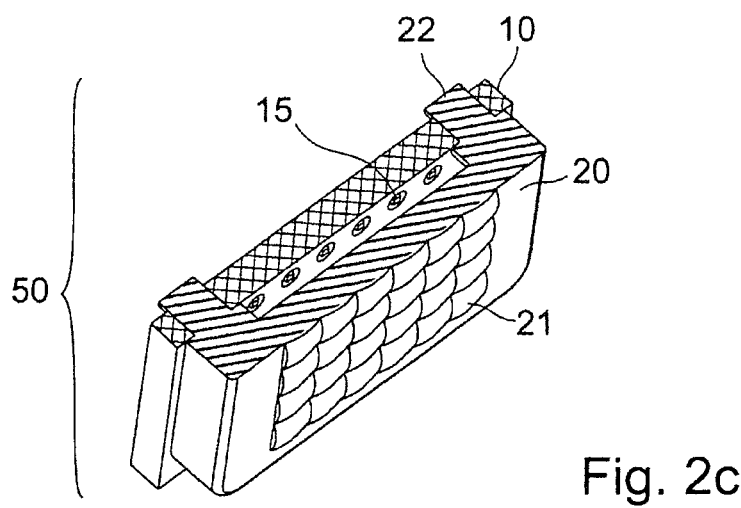

In the FIGS. 2a-2c a concrete embodiment example of an illumination device 50 is represented. The illumination device 50 comprises a light-source receiving means 10, on which a multiplicity of light source positions 11 is provided, each of which is configured to receive a light source 15. The light-source receiving means 10 is e.g. configured as a circuit board and has an electrical wiring structure (not shown) necessary for operating the light sources 15, said wiring structure permitting a selective driving of each individual light source. The light source positions 11 in this example are formed by depressions in the light-source receiving means in which respectively one light source 15 can be fastened. Moreover, FIG. 2a shows a microlens array 20 associated with the light-source receiving means 10 that has a multiplicity of microlenses 21. The light-source receiving means 10 and the microlens array 20 are coordinated with each other such that with each of the light source positions 11 there is associated exactly one of the microlenses 21. For this purpose the microlenses 21 within the microlens array 20 are arranged in the same grid as the light source positions are arranged on the light-source receiving means 10. The microlens array 20 is configured as a one-pieced body and is for example formed by a glass body or by a transparent plastic body. The diameter of the individual microlenses lies e.g. in the μm region or in the mm region.

To form an illumination device 50 several or all light source positions 11 are equipped with respectively one light source 15, compare FIG. 2b. As light sources 15 e.g. LEDs and/or OLEDs and/or VCSELs are employed. The light sources 15 have a multiplicity of different emission spectra. For example each of the light sources 15 has a different emission spectrum to those of the other light sources 15. However, alternatively also several identical light sources 15 can be used, e.g. to obtain a sufficient illumination intensity also in a spectral range with low-luminosity light sources.

For fastening the microlens array 20 the body of the microlens array 20 is equipped with fastening pins 22, which are inserted in matching holes 12 in the light-source receiving means 10. After inserting the fastening pins 22 the microlens array 20 and the light-source receiving means 10 are fixed to each other, e.g. by a form-fitting connection or by bonding. The light-source receiving means 11 with the light sources 15 arranged thereon and the microlens array 20 fastened on the light-source receiving means 11 form an illumination device 50, compare FIG. 2c. The light emitted by the individual light sources 15 is collected by the microlens 21 arranged above the respective light source 15. Since the fastening pins 22 are configured as integral components of the body of the microlens array 20, their position relative to the microlenses 21 is defined very exactly. In this fashion by the fastening of the microlens array 20 by means of the fastening pins 22 the optimal position of the microlens array 20 relative to the light sources 15 is achieved automatically. In the production of the sensor 100 consequently no adjustment of the illumination device 50 is required.

The sensor for checking value documents is in the following explained with reference to the example of a remission sensor. However, the sensor according to the invention can also be configured as a transmission sensor. For this purpose the detection device will be arranged opposite the illumination device, so that the light transmitted by the value document is detected.

Figure 3A:
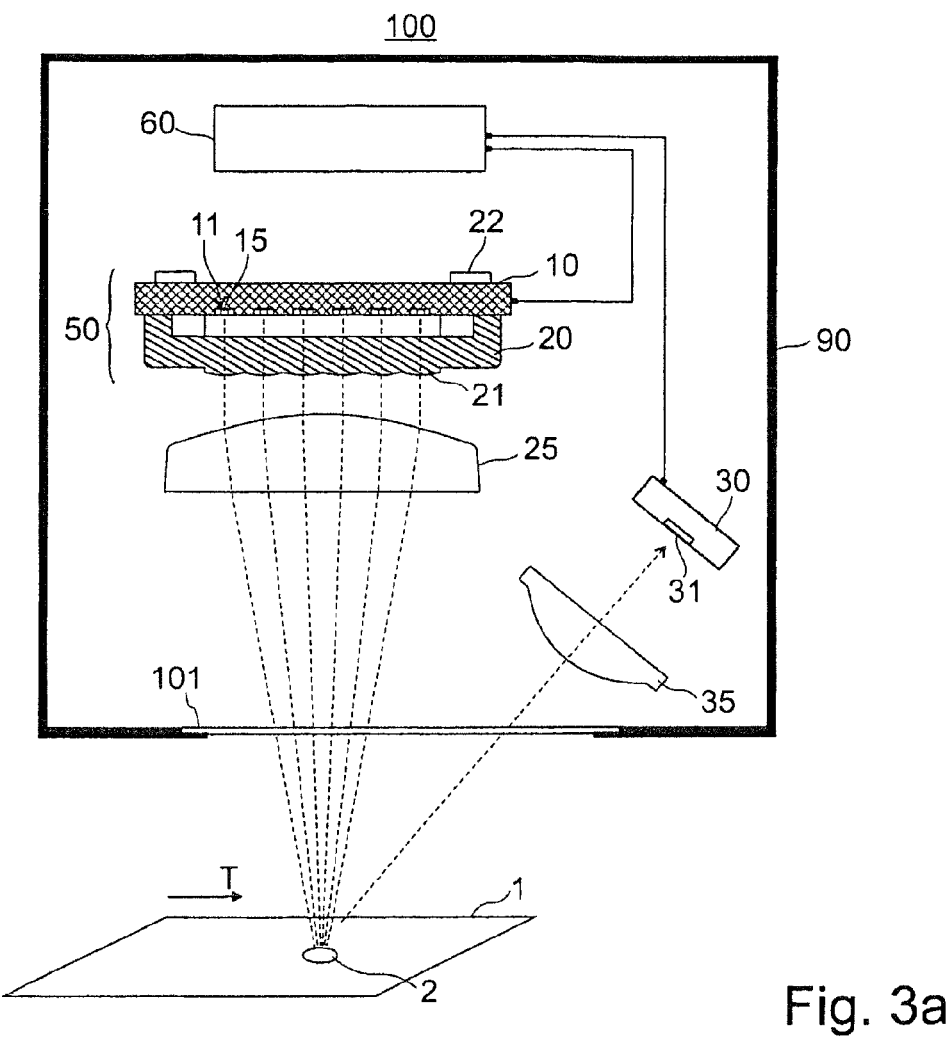

The illumination device 50 is installed in a sensor 100 which is configured to check value documents, compare FIG. 3a. The light emitted by the illumination device 50 is imaged by an imaging lens 25 onto the value document 1. By the value document 1 proportions of the illuminating light are remitted in dependence on the optical properties of the value document 1. The light remitted by the value document 1 is detected with the aid of a detection device 30 having a light-sensitive region 31. The detection device 30 can be formed e.g. by a photo diode or a photo transistor. Optionally in front of the detection device 30 a detection optic 35 can be arranged, by which the light remitted by the value document 1 is collected and directed onto the light-sensitive region 31. In the shown example the illuminating light is imaged vertically onto the value document 1 and the detection device 30 captures the light remitted under an oblique angle. Alternatively also the illumination can take place under an oblique angle and the detection device can capture the light remitted in vertical direction or in oblique direction. For detecting the remission light there can also be provided several identical detection devices, e.g. to capture the remission light over a larger angular range, or several different detection devices, e.g. to extend the capturable spectral range.

The sensor 100 has a housing 90 on whose lower side there is arranged a transparent window 101. The light emitted by the illumination device 50 is imaged through the window 101 onto a value document 1 to be checked, which is transported past the sensor 100 along a transport direction T. The illumination device 50, in particular the light sources 15 and the detection device 30 are driven by a control device 60, which is arranged within the housing 90 in this example. The control device 60 switches the light sources 15 successively on and off again, for example such that at any point in time exactly one light source 15 is switched on. During the switched-on phase of the light sources the detection device 30 captures respectively one measured value that corresponds to the light intensity remitted by the value document 1. The value document 1 is illuminated successively with the different emission spectra of the different light sources 15. Since the detection device 30 records respectively one measured value synchronously to the illumination, thus in every spectral range predetermined by the light sources 15, the light intensity remitted by the value document 1 is measured.

The control device 60 drives the light sources 15 such that the illumination sequence with which the light sources 15 are switched on and off again is periodically repeated. For example the control device 60 can be programmed such that during every illumination sequence each light source 15 of the illumination device is switched on and off exactly once. Alternatively a light source 15 can also be driven several times per illumination sequence, e.g. to compensate the low intensity of a low-intensity light source 15 by multiple measuring. An illumination sequence can either comprise the driving of all light sources 15 present in the illumination device 50 or only part of the light sources 15 present. After an illumination sequence, i.e. after a measured value was recorded under illumination with every emission spectrum provided for the measuring, the next illumination sequence starts, in which a measured value is recorded again under illumination with every emission spectrum provided for the measuring, etc.

Figure 3B:
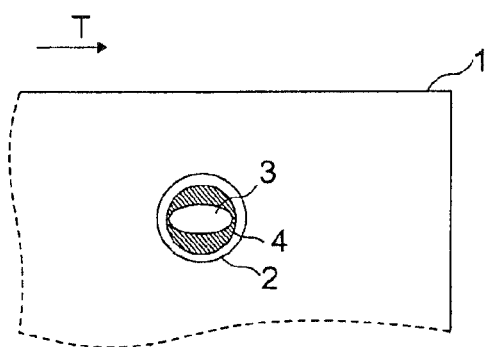

FIG. 3b shows a partial region of the value document 1 on which the region 2 illuminated by the illumination device 50 is shown. By the light pulses of the various light sources 15 a portion 4 of the illumination region 2 is illuminated respectively with homogeneous light intensity. For all light sources of the illumination device 50 largely the same portion 4 of the illuminated region 2 is illuminated homogeneously. Further the detection region 3 is shown, which is arranged completely within the homogeneously illuminated portion 4 of the illumination region 2.

The duration of the illumination sequence is coordinated with the transport speed of the value document 1 in such a fashion that the different measured values of an illumination sequence come at least approximately from the same detection region 3 on the value document 1 transported past. The distance covered by the value document 1 from the start to the end of the same illumination sequence is consequently much smaller than the length of the detection region 3. The measured values obtained during an illumination sequence supply the spectral dependence of the remission of the value document 1 in the respective detection region 3.

The invention claimed is:

1. A sensor for checking a value document which, for checking the value document, is present in a measuring plane, comprising:

an illumination device illuminating a region of the measuring plane, and comprising a multiplicity of different light sources which are arranged side by side and whose emission spectra differ from each other, and a microlens array with a multiplicity of microlenses, wherein the microlens array and the light sources are arranged relative to each other so that with each of the light sources there is associated exactly one of the microlenses, so that the emission light emitted by the light source is collectable by the microlens associated with the light source, and an imaging optic, by which the light of the different light sources emitted by the illumination device is imaged onto the illuminated region of the measuring plane, wherein the measuring plane lies so close to a focal point of the imaging optic that the light of the different light sources emitted by the illumination device is imaged largely onto the same illuminated region of the measuring plane, and a detection device arranged to detect light which, upon checking the value document, when the illuminated region is an illuminated region of the value document, emanates from the illuminated region.

2. The sensor according to claim 1, wherein the microlenses of the microlens array and the imaging optic are arranged and configured in such a way that the light sources, upon illuminating the region, are imaged in a blurred fashion onto the illuminated region of the measuring plane.

3. The sensor according to claim 1, wherein each of the light sources is imaged by the microlens associated therewith and the imaging optic such that the region of the measuring plane illuminated by the light source is enlarged in comparison to the light source.

4. The sensor according to claim 1, wherein the measuring plane lies so close to a focal point of the imaging optic that the respective illuminated region of the measuring plane, onto which the light of one of the different light sources of the illumination device is imaged by the imaging optic, overlaps by at least 50% with the region of the measuring plane illuminated by the other light sources of the illumination device.

5. The sensor according to claim 1, wherein the light sources and the microlens array are arranged relative to each other such that each light source of the illumination device is less remote from the microlens associated therewith than the focal length of the microlens.

6. The sensor according to claim 1, wherein the microlenses of the microlens array are configured as aspherical microlenses.

7. The sensor according to claim 6, wherein a shape of the aspherical microlenses respectively deviates from a spherical lens shape in such a manner that the surface of the respective microlens at the edge of the microlenses is less strongly curved than in the middle of the microlenses.

8. The sensor according to claim 1, wherein between the microlens array and the imaging optic there is arranged a scatterer for homogenizing the light emitted by the illumination device.

9. The sensor according to claim 1, wherein the microlens array is configured as a one-piece body.

10. The sensor according to claim 1, wherein upon operating of the sensor, there is detected only light from a detection region of the value document, said detection region being located completely within the illuminated region.

11. The sensor according to claim 1, wherein the multiplicity of light sources, upon operating of the sensor, are successively switched on and off, so as to illuminate the region of the value document with an illumination sequence of light pulses with different emission spectra.

12. An apparatus for checking value documents comprising the sensor recited in claim 1.

13. The sensor according to claim 1, wherein the imaging optic has at least one aspherical imaging lens.

14. The sensor according to claim 13, wherein a shape of the aspherical imaging lens deviates from a spherical lens shape in such a manner that the surface of the imaging lens at the edge of the imaging lens is less strongly curved than in the middle of the imaging lens.

15. The sensor according to claim 1, wherein the microlenses of the microlens array are configured as aspherical microlenses and the imaging optic has at least one aspherical imaging lens.

16. The sensor according to claim 15, wherein an aspherical shape of the microlenses and an aspherical shape of the imaging lens are coordinated with each other in such a way that a portion within the illuminated region of the measuring plane is homogeneously illuminated by the emission light of each of the different light sources.

17. The sensor according to claim 15, wherein a shape of the aspherical microlenses and a shape of the aspherical imaging lens deviate qualitatively in the same manner from a spherical lens shape.

18. The sensor according to claim 15, wherein a shape of the aspherical microlenses respectively deviates from a spherical lens shape in such a manner that the surface of the respective microlens at the edge of the microlens is less strongly curved than in the middle of the microlens.

19. The sensor according to claim 15, wherein a shape of the aspherical imaging lens deviates from a spherical lens shape in such a manner that the surface of the imaging lens at the edge of the imaging lens is less strongly curved than in the middle of the imaging lens.

* * * * *